United States Patent
Jeong (10) Patent No.: US 7,706,460 B2
(45) Date of Patent: Apr. 27, 2010

(54) QAM SIGNAL DECODING

(75) Inventor: Jun-young Jeong, Suwon (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 1662 days.

(21) Appl. No.: 10/875,690

(22) Filed: Jun. 25, 2004

(65) Prior Publication Data

US 2005/0002465 A1   Jan. 6, 2005

(30) Foreign Application Priority Data

Jul. 3, 2003   (KR) .............. 10-2003-0044849

(51) Int. Cl.
    *H04L 5/12* (2006.01)
(52) U.S. Cl. ............... 375/261; 375/260; 375/262; 375/263; 375/264; 375/265; 375/287; 375/316; 375/341; 375/346
(58) Field of Classification Search .......... 375/260, 375/261, 262, 263, 264, 265
    See application file for complete search history.

(56) References Cited

U.S. PATENT DOCUMENTS

| | | | |
|---|---|---|---|
| 5,479,447 A | | 12/1995 | Chow et al. |
| 5,521,942 A | * | 5/1996 | Betts et al. ............ 375/295 |
| 5,966,412 A | * | 10/1999 | Ramaswamy ........... 375/341 |
| 6,160,854 A | * | 12/2000 | Heegard et al. ......... 375/265 |
| 6,310,926 B1 | * | 10/2001 | Tore .................... 375/355 |
| 6,421,394 B1 | * | 7/2002 | Tanrikulu ............... 375/261 |
| 6,868,118 B2 | * | 3/2005 | Joo ..................... 375/222 |
| 7,106,810 B2 | * | 9/2006 | Collins et al. ........... 375/316 |
| 2002/0196861 A1 | * | 12/2002 | Tzannes et al. ......... 375/261 |
| 2003/0235240 A1 | * | 12/2003 | Kawamoto et al. ...... 375/148 |
| 2004/0165656 A1 | * | 8/2004 | Shiue et al. ............ 375/150 |

FOREIGN PATENT DOCUMENTS

| | | |
|---|---|---|
| EP | 1 024 634 A2 | 8/2000 |
| JP | 06-252891 | 9/1994 |
| JP | 07-058795 | 3/1995 |
| JP | 07-504072 | 4/1995 |
| JP | 10-145441 | 5/1998 |
| JP | 2922815 | 4/1999 |

OTHER PUBLICATIONS

French Office Action (dated Oct. 9, 2007) for counterpart French Patent Application 0407376000 is provided for the purposes of certification under 37 C.F.R. §§ 1.97(e) and 1.704(d).
Japanese Office Action dated Jan. 5, 2010.

* cited by examiner

*Primary Examiner*—Chieh M Fan
*Assistant Examiner*—Siu M Lee
(74) *Attorney, Agent, or Firm*—Harness, Dickey & Pierce, P.L.C.

(57) ABSTRACT

A demodulator recovers a transmitted symbol represented by a received quadrature amplitude modulation (QAM) signal. Such a demodulator may include: a QAM-decoding block operable to map a received signal vector onto a constellation so as to yield a first symbol, and identify a next-most probable second symbol based upon the signal vector; and a selection unit operable to select, among the first and second symbols, the one having the lower error content as corresponding to the transmitted symbol. A corresponding method may include similar steps.

12 Claims, 9 Drawing Sheets

QAM SIGNAL DECODING

PRIORITY INFORMATION

This application claims the priority of Korean Patent Application No. 2003-0044849, filed on Jul. 3, 2003, in the Korean Intellectual Property Office, the disclosure of which is incorporated herein in its entirety by reference.

BACKGROUND OF THE PRESENT INVENTION

Transmission of data (input data) through a channel typically involves coding and modulation. Coding generally changes the representation of the input data to a format whose characteristics are better suited to withstand the noise characteristics of the channel. Modulation takes the coded digital data and converts it to an analog radio wave.

Multiple carrier modulation techniques, e.g., orthogonal frequency division multiplexing (OFDM), are generally known. An example of a modulation technique generally known per se, and generally known-to-be used-with OFDM, is quadrature amplitude modulation (QAM).

Figure 1:
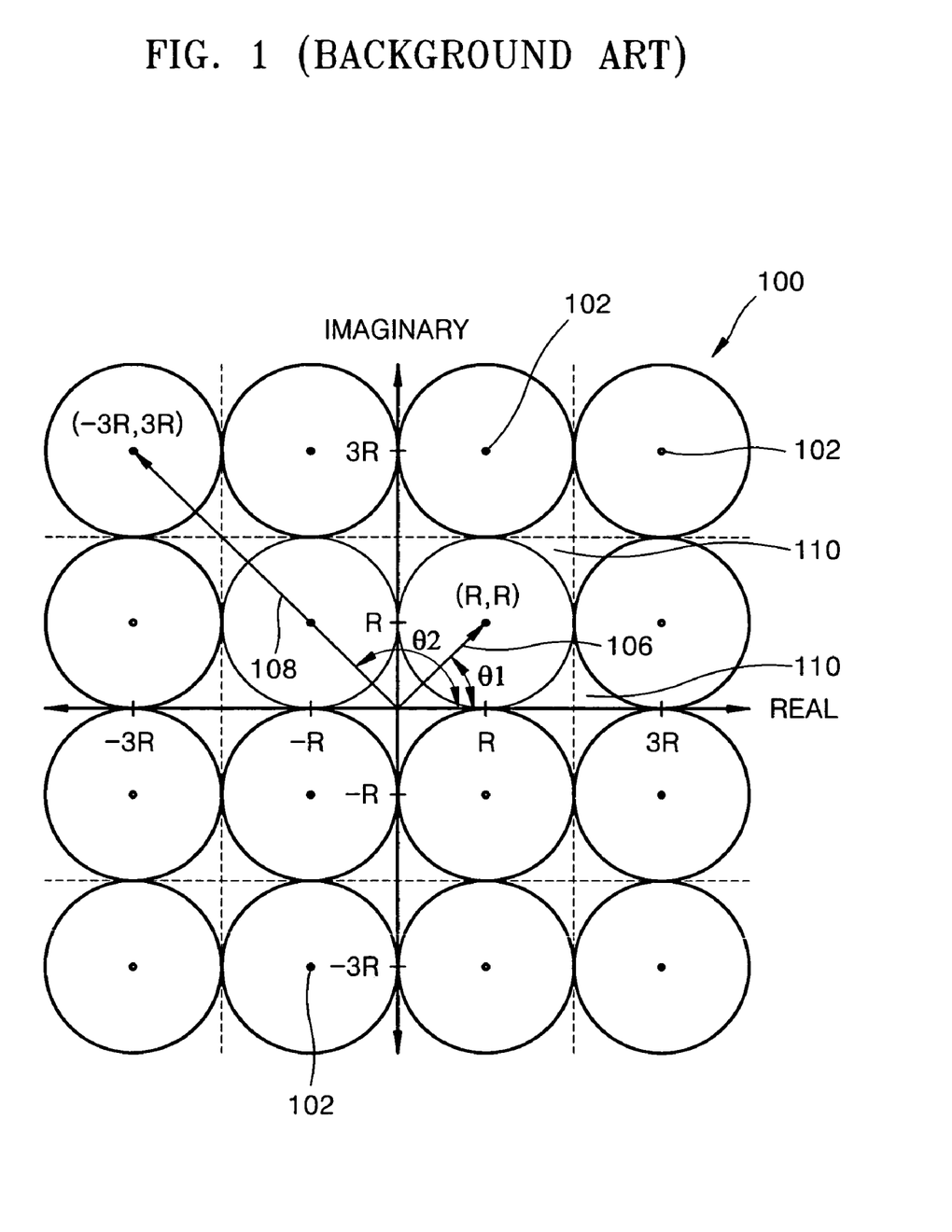
FIG. 1 depicts a constellation of symbols corresponding to 16QAM, according to the Background Art.

For example, 16 QAM can transfer up to 16 ($=2^4$) different types of symbols on a given sub-channel of, e.g., an OFDM-coded signal. FIG. 1 depicts a constellation 100 of symbols 102 corresponding to 16QAM, according to the Background Art. Each symbol 102 is centered in a cell 110. Symbols are identified by Cartesian coordinates that assume a unit value of R (to be discussed further below). A received signal vector is represented by a vector in polar notation (amplitude, phase). Assuming an ideal and noiseless channel, two example received signal vectors 106 and 108 having coordinates ($\sqrt{2}R$, θ1) and ($3\sqrt{2}R$, θ2), respectively, are depicted. Because an ideal, noiseless channel is assumed, received signal vectors 106 and 108 are mapped exactly to symbols (R,R) and (−3R, 3R), respectively.

A real channel is not ideal. So before sending input data through a real channel, a training or initializing process is performed on the channel to determine an amount that the channel should be expected to change the amplitude $$(\Delta A_{CH}^{expected})$$

and phase $$(\Delta \Theta_{CH}^{expected})$$

of a transmitted signal vector (TV), i.e., to determine the transfer function $$(H_{CH}^{noiseless})$$

of the real but (assumed) noiseless channel.

$$H_{CH}^{noiseless} = f(\Delta A_{CH}^{expected}, \Delta \Theta_{CH}^{expected}) \quad (1)$$

Figure 2:
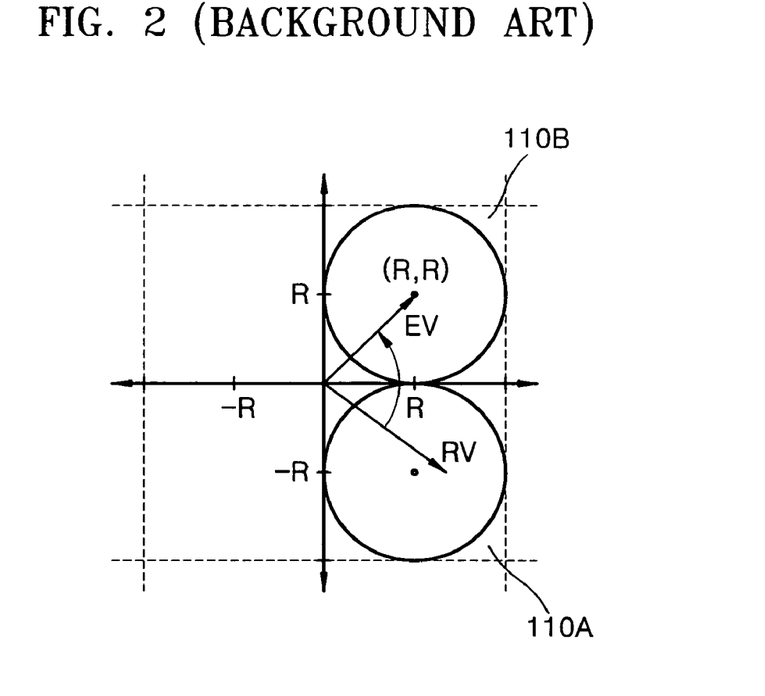
FIG. 2 depicts a non-ideal channel compensation scheme according to the Background Art.

A Background Art receiver then compensates the received vector (RV) by the expected amounts of change to produce a corresponding expected (compensated) vector (EV), i.e., to decode RV. Assuming a noiseless channel, FIG. 2 depicts such a non-ideal channel compensation scheme according to the Background Art. In FIG. 2, received vector RV would have been mapped into cell 110A, but compensated vector EV is mapped to polar coordinates ($\sqrt{2}R$, θ1) in cell 110B, which identifies symbol (R,R) as corresponding to RV.

A real channel also is not noiseless. Hence, received vector is more accurately described as follows.

$$RV = H_{CH}^{noiseless} \cdot TV + NV \quad (2)$$

What otherwise would have been a compensated vector EV for a noiseless channel is now described as an equivalent vector (EQV), as follows.

$$EQV = EV^{noiseless} + NV \quad (3)$$

Figure 3:
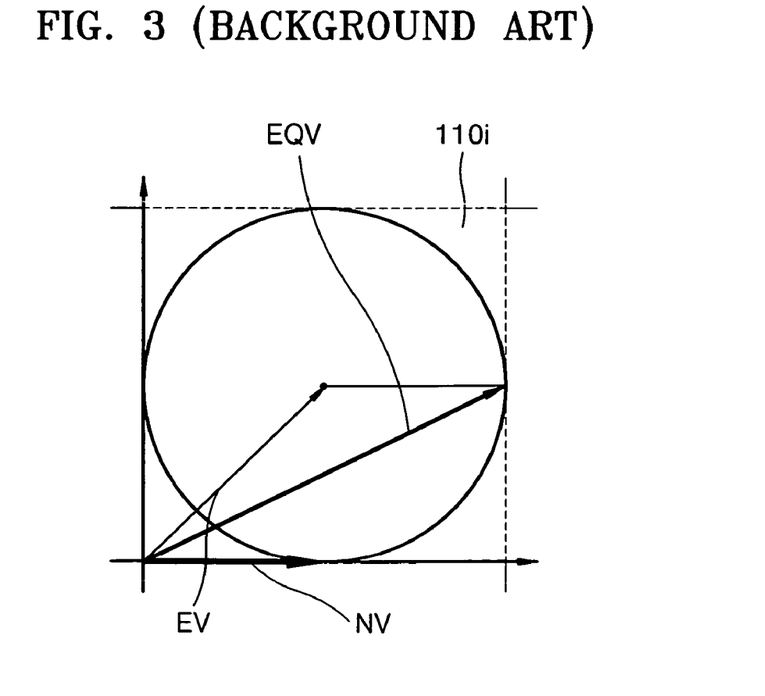
FIG. 3 depicts a decoding scheme according to the Background Art FIG. 3.

Equivalent vector EQV will typically not map directly to a symbol because of noise in the channel. According to the Background Art, the cell into which compensated vector EQV maps is considered to determine the symbol which compensated vector EQV represents. In other words, received vector RV is decoded by assuming that equivalent vector EQV represents the symbol of the cell in which EQV is mapped. Up to an amplitude R of noise can be decoded with high confidence. Such a decoding scheme is depicted in Background Art FIG. 3 for cell 110i.

SUMMARY OF THE PRESENT INVENTION

One of the embodiments of the present invention is directed to a demodulator for recovering a transmitted symbol represented by a received quadrature amplitude modulation (QAM) signal. Such a demodulator may include: a QAM-decoding block operable to map a received signal vector onto a constellation so as to yield a first symbol, and identify a next-most probable second symbol based upon the signal vector; and a selection unit operable to select, among the first and second symbols, the one having the lower error content as corresponding to the transmitted symbol.

Another of the embodiments of the present invention is directed to a method of recovering a transmitted symbol represented by a received quadrature amplitude modulation (QAM) signal. Such a method may include: mapping a received signal vector onto a constellation to yield a first symbol; identifying a next-most probable second symbol based upon the signal vector; and selecting, among the first and second symbols, the one having the lower error content as corresponding to the transmitted symbol.

Additional features and advantages of the present invention will be more fully apparent from the following detailed description of example embodiments and the accompanying drawings.

BRIEF DESCRIPTION OF THE DRAWINGS

The other drawings are: intended to depict example embodiments of the present invention and should not be interpreted to limit the scope thereof.

DETAILED DESCRIPTION OF EXAMPLE EMBODIMENTS

Figure 4A:
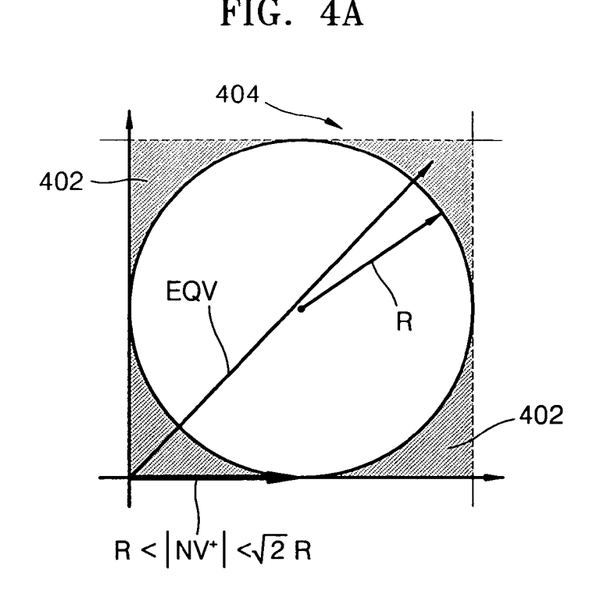
FIG. 4A depicts a circumstance in which an equivalent vector maps to a corner of a cell of a QAM constellation, which (in part) illustrates problems recognized during development of the present invention.
Figure 4B:
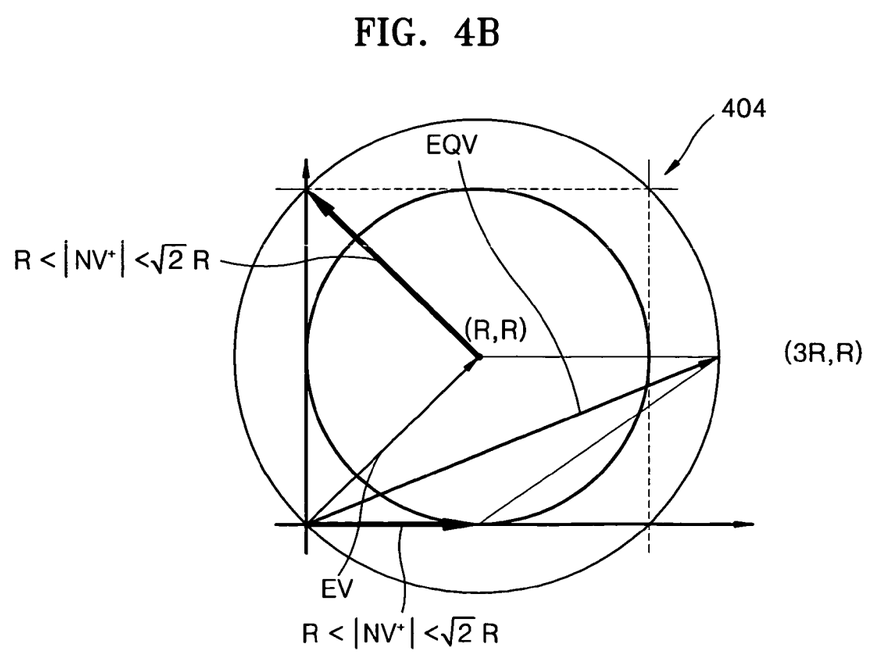
FIG. 4B depicts a circumstance in which a noise vector $NV^+$ can cause a transmitted vector TV to result in a larger equivalent vector EQV that maps outside a cell to which IV should correspond, which (in part) illustrates problems recognized during development of the present invention.

In developing the present invention, the following problems with the Background Art were recognized and the physics thereof determined. Where a larger noise vector NV (hereafter $NV^+$) has a magnitude $R<|NV^+|<\sqrt{2}R$ such that $|NV^+|>|NV|$, there can be equivalent vectors that map to corners 402 (hereafter $EQV^{corner}$) of cell 404 of a QAM constellation, such as is depicted in FIG. 4A for a cell 404 in a QAM constellation. As the Background Art has a high confidence level only for $|NV|\leq R$, it is a problem that corner vectors $EQV^{corner}$ are decoded by the Background Art with low confidence. Also, such a noise vector $NV^+$ can cause a transmitted vector TV (corresponding, e.g., to symbol (R,R)) to result in a larger equivalent vector EQV that maps outside cell 404 (hereafter $EQV^{|NV+|}$), as indicated in FIG. 4B. A Background Art receiver would decode (incorrectly) equivalent vector $EQV^{|NV+|}$ as adjacent symbol, e.g., (3R,R). It is a problem that the Background Art receiver cannot decode $EQV^{NV+|}$ as corresponding to symbol (R,R) in the circumstance of large noise $|NV^+|$.

Figure 5A:
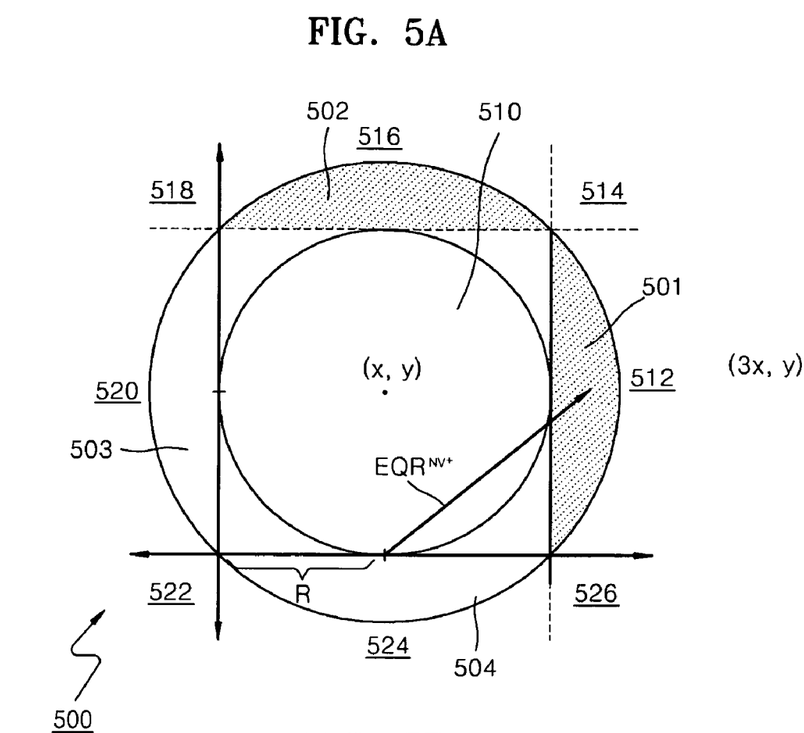
FIG. 5A is a partial diagram of a QAM constellation according to an embodiment of the present invention.

FIG. 5A is a partial diagram of a QAM, e.g., 16 QAM, constellation 500 according to an embodiment of the present invention. Constellation 500 includes 16 square cells, some of which, namely cells 510-526, are shown. Cell 510, like all other cells in constellation 500, has a side of length 2R. Cell 510 shares a side with each of cells 512, 516, 520 and 524, respectively. For purposes of discussion, cell 510 corresponds to symbol (x,y) and cell 512 to symbol (3x,y).

Figure 5B:
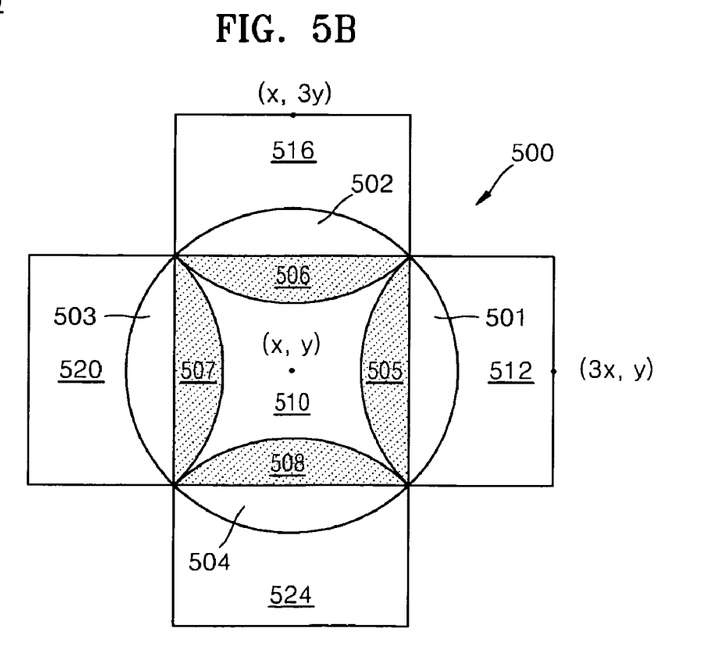
FIG. 5B is a variation of the QAM constellation depicted in FIG. 5A.

In FIG. 5A, a circle of radius $r=\sqrt{2}R$ has overlap regions 501-504 that are: adjoining and outside cell 510; and overlapping/intersecting with each of adjoining cells 512, 516, 520 and 524, respectively. FIG. 5B is a variation of QAM constellation 500 depicted in FIG. 5A. In FIG. 5B, not only overlap regions 501-504 are depicted, but also overlap regions 505-508 of adjoining cells 512, 516, 520 and 524, respectively, are depicted. Similarly, overlap regions 505-508 are located outside cells 512, 516, 520 and 524, respectively, and are located inside cell 510. Overlap regions 501-508 can be described as organized into symmetric pairs 501&505, 502&506, 503&507 and 504&508.

As recognized and understood as part of developing the present invention, where an equivalent vector maps to an overlap region, e.g., 502, there are two possible corresponding symbols: the symbol for the cell in which the overlap region is located, e.g., (continuing the example introduced above) symbol (x,3y) for $EQV^{|NV|\leq R}$ where $|NV|\leq R$; and the symmetric symbol located in the cell in which the symmetric overlap region (e.g., continuing the example introduced above, 501) is located, e.g., (continuing the example introduced above) symbol (x,y) for $EQV^{R<|NV+|\leq(\sqrt{2})R}$ where $R<|NV^+|\leq(\sqrt{2})R$. According to embodiments of the present invention, a receiver (and related software and methodology) performs error checking to determine whether a symbol, e.g., (x,3y), or its symmetric counterpart symbol, e.g., (x,y), corresponds to the equivalent vector mapped to overlap region 502. In other words, one of the symbol and its symmetric counterpart symbol is the true symbol and one is false, and such a receiver determines which is the true symbol. As a result, an equivalent vector that maps to a member of any symmetric pair in constellation 500, e.g., symmetric pair 502&506 can be successfully decoded as corresponding to symbol (x,3y) or symbol (x,y) according to such error checking, etc.

Figure 6:
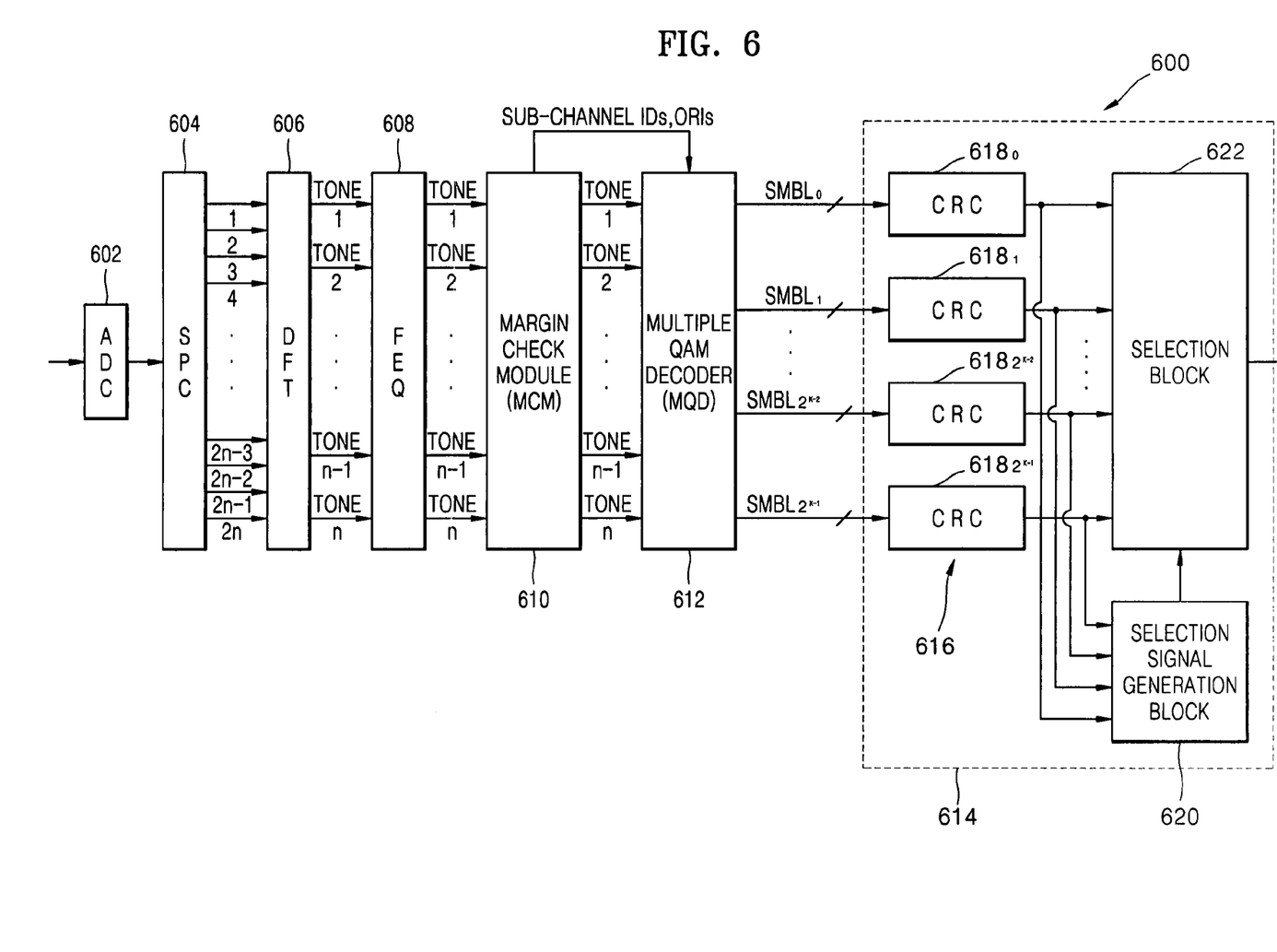
FIG. 6 is a block diagram of a QAM-decoding receiver according to a first embodiment of the present invention.

FIG. 6 is a block diagram of a QAM-decoding receiver 600 according to a first embodiment of the present invention. Receiver 600 includes: an analog-to-digital converter (ADC) 602; a serial-to-parallel converter (SPC) 604; a discrete Fourier transformation (DFT) unit 606; a frequency equalizer (FEQ) 608; a margin check module (MCM) 610; a multiple QAM-signal decoder (hereafter MQD) 612; and a selection unit 614. SPC 604 outputs 2n signals in parallel to DFT 606. Each of DFT 606, FEQ 608 and MCM 610 outputs n parallel signals or tones, where n is a natural number, over a corresponding number of sub-channels (between 606 and 608, between 608 and 610, and between 610 and 612). MQD 612 outputs $2^k$ signal frames corresponding to symmetric pairs of overlap regions, there being a pair of symmetric symbols for each symmetric pair of overlap regions, wherein k is the number of tones (among the n tones, k<n) which are located in the overlap region. In addition, for $2^k$ frames, MCM 610 outputs a list of sub-channels that are identified as being extra-noisy. For those sub-channels appearing on this list, a selection between respective symmetric symbols should be made. Such a selection can be performed by selection unit 614. Selection between symmetric symbols is discussed below.

In a training or initializing process, extra-noisy sub-channels are determined. If the SNR (signal to noise ratio) of a sub-channel is lower than a reference level, then the sub-channel is determined to be extra-noisy. MCM 610 monitors the extra-noisy sub-channels during data transmission. If a signal of an extra-noisy sub-channel is located in an overlap region, then the ID of that extra-noisy sub-channel is transferred to MQD 612 as part of the list of sub-channels for which a selection between respective symmetric symbols should be made. As an example based upon FIG. 5A, if the sub-channel is extra-noisy and if the signal on the sub-channel maps to overlap region 501, then MQD 612 outputs the ID of the sub-channel, the symbol to which the signal location nominally maps, namely, (3x, y) and its symmetric counterpart symbol (x,y).

ADC 602 receives a distorted serial analog signal from the channel, e.g., from an antenna, and outputs a serial digital version of the distorted signal, which SPC 604 converts to 2n parallel signals. DFT unit 606 performs a DFT on the time-domain signals from SPC 604 and outputs corresponding frequency-domain versions (also referred to as tones or QAM signals), respectively. An $i^{th}$ QAM signal or tone$_i$ is represented as a complex number. FEQ 608 equalizes the tones from DFT unit 606, compensating for amplitude $$(\Delta A_{CH}^{expected})$$

and phase $$(\Delta \Theta_{CH}^{expected})$$

changes induced by the non-ideal channel, in keeping with a channel training/initialization process performed previously.

MCM module 610 periodically measures a signal-to-noise ratio (SNR) for each sub-channel and compares each SNR against a predetermined reference (REF), $SNR_i \overset{?}{<} REF$ (where REF value could be determined in the training/initialization process). MCM 610 can be provided with memory so that the SNR can be cumulative. If $SNR_i < REF$, then sub-channel(i) has demonstrated a likelihood of exhibiting $NV^+$ rather than NV, where (again) $|NV^+| > |NV|$. After the channel training/initializing process, MCM 610 monitors each sub-channel for which the SNR is less than the REF. If a transmitted QAM signal on the sub-channel which is monitored by MCM 610 is located in the overlap region, the MCM 610 outputs the sub-channel ID, the nominally-mapped symbol and the symmetric counterpart symbol. For each frame of transmitted symbols, MCM module 610 outputs a list of sub-channels meriting selection between symmetric symbols, as well as the overlap-region information (ORI) (namely, the nominally-mapped symbol and the symmetric counterpart symbol) for each channel.

MQD 612 can include up to $2^n$ QAM decoders where all n sub-channels are extra-noisy. Each QAM decoder decodes n equalized tones into a bit stream. If there are a total of k extra-noisy sub-channels on the list, k<n, then the total number of QAM decoders $2^k$ (which also represents the number of bit streams).

For example, assume that two sub-channels (sub-channel ID 1 and n) among the n sub-channels have QAM signals which are located in overlap regions. A first QAM decoder decodes a first set of n equalized tones into a first bit stream (SMBL0), the first n equalized tones being comprised of the original (or, in other words, the nominally-mapped) symbols for the sub-channels 1 to n. A second QAM decoder decodes a second set of n equalized tones into a second bit stream (SMBL1), the second n equalized tones being comprised of the symmetric counterpart symbol for the original (again, in other words, nominally-mapped) symbol of sub-channel ID 1, the original symbol on sub-channel 2, . . . and the original symbol on sub-channel n. A third QAM decoder decodes a third set of n equalized tones into a third bit stream (SMBL2), the third n equalized tones being comprised of the original symbol of sub-channel ID 1, the original symbol on sub-channel 2, . . . and the symmetric counterpart symbol for the original symbol of sub-channel ID n. The fourth QAM decoder decodes a fourth set of n equalized tones into a fourth bit stream (SMBL3), the fourth n equalized tones being comprised of the symmetric symbol for the original symbol on sub-channel 1, the original symbol on sub-channel 2, . . . and the symmetric counterpart symbol for the original symbol of sub-channel n.

Selection unit 614 of FIG. 6 includes: $2^k$ error-checking (E√), e.g., cyclic redundancy check (CRC), units 618$_0$, 618$_1$, . . . 618$_{2^{k-2}}$ and 618$_{2^{k-1}}$; a selection signal generation block 620; and a selection block (also known as switching unit) 622 to select between bitstreams from SMBL$_0$, SMBL$_1$, . . . SMBL$_{k-1}$.

Figure 7:
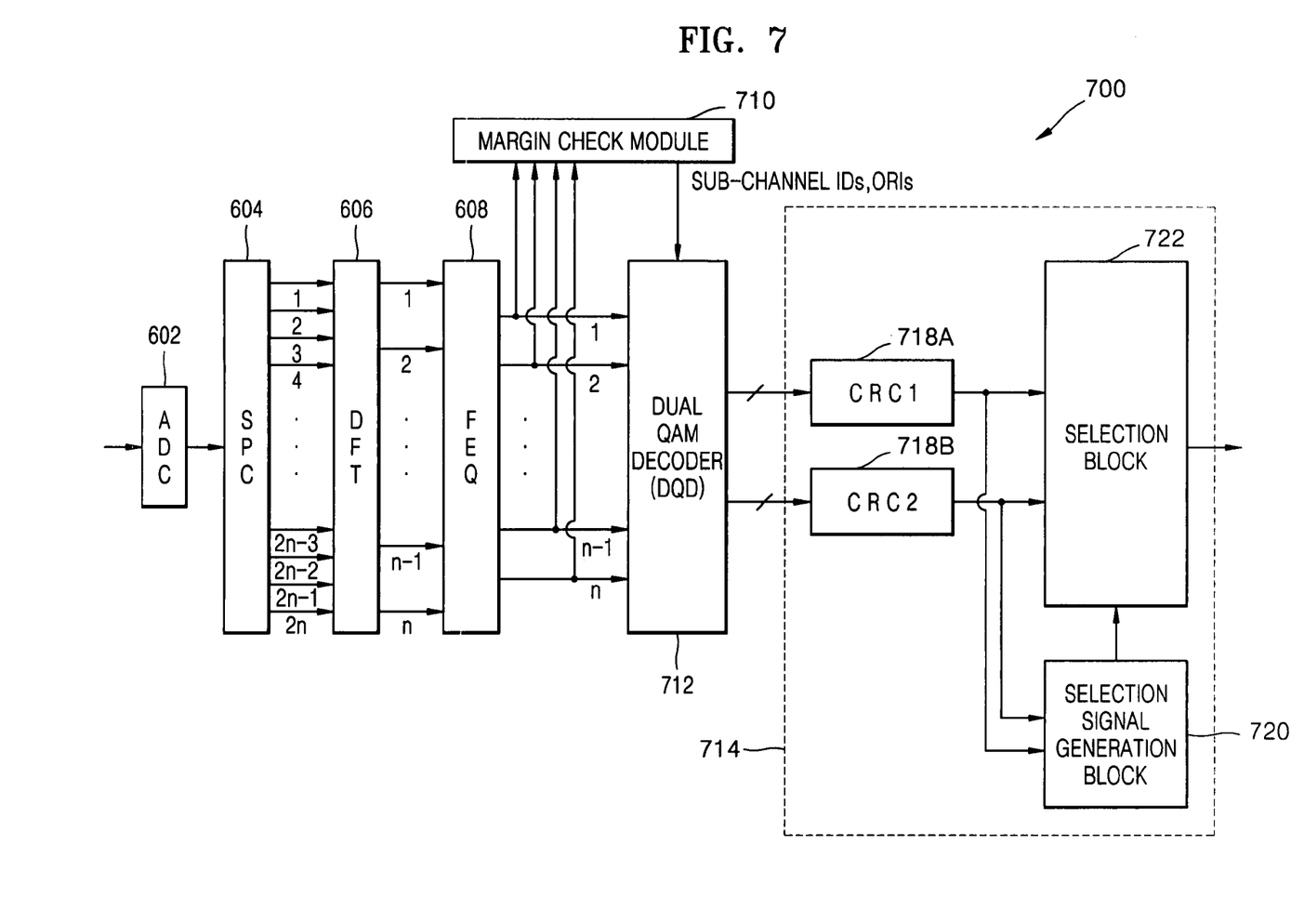
FIG. 7 is a block diagram of another QAM-decoding receiver according to a second embodiment of the present invention.

FIG. 7 is a block diagram of another QAM-decoding receiver 700 according to a second embodiment of the present invention. Receiver 700 is similar to receiver 600, as reflected in the use of the same item numbers and corresponding item numbers (e.g., 612 and corresponding 712). For brevity, differences between receivers 700 and 600 will be described. Receiver 700 reflects an assumption that, typically, only one sub-channel will exhibit a low enough SNR to merit selection between symmetric symbols. Accordingly, receiver 700 includes: a margin check module (MCM) 710; a dual QAM decoder (DQD) 712; and a selection unit 714. Selection unit 714 itself includes: 2 error-checking (E√), e.g., cyclic redundancy check (CRC), units 718A and 718B; a selection signal generation block 720; and a selection block (also known as switching unit) 722.

In contrast to MCM 610, MCM 710 does not output a list of extra-noisy sub-channels but instead identifies the one sub-channel that is extra-noisy as well as the associated overlap region information, given the assumption mentioned above (namely, of there being only one extra-noisy sub-channel). DQD 712 correspondingly generates a symmetric symbol pair for the extra-noisy sub-channel identified by MCM 710. Selection signal generation block 720 and switching unit 722 are simplified versions of units 620 and 622, respectively.

Figure 8:
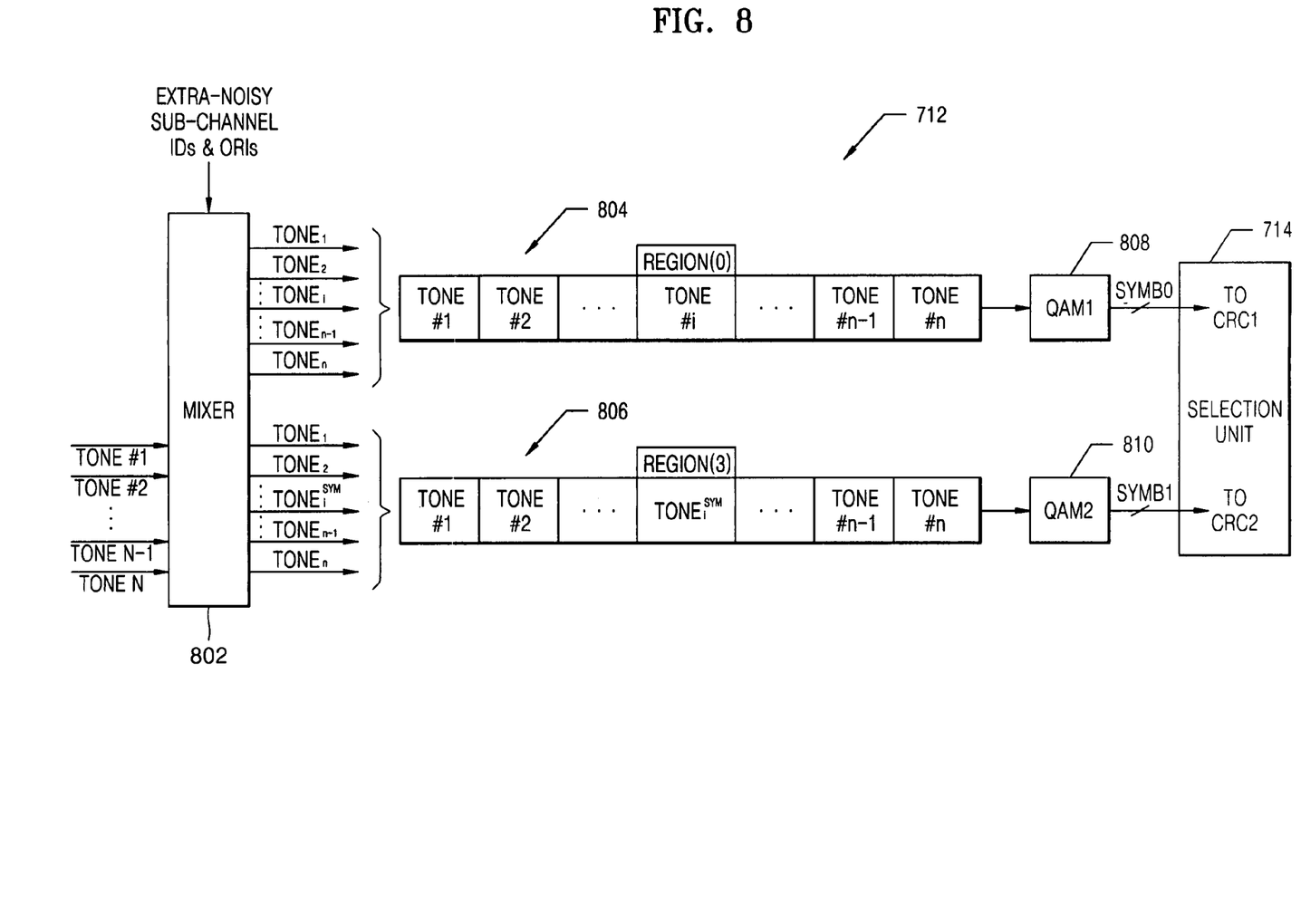
FIG. 8 is a block diagram of DQD 712, according to an embodiment of the present invention.

FIG. 8 is a block diagram of DQD 712, according to an embodiment of the present invention. DQD 712 includes: a mixer 802; buffers 804 and 806; and QAMs 808 and 810. Mixer unit 802 receives the n tones from FEQ 608 and generates 2n tones, e.g., Tone$_i$ is converted to Tones$_i^{SYM}$ according to the extra noisy sub-channel ID and overlap region information from the MCM 710. QAM 808 reads each tone value (complex data) from buffer 804 and decodes it into corresponding bits. After n tone values are decoded, QAM 808 concatenates n decoded bits and outputs the same as a first bit-stream (SYMB0). QAM 810 reads each tone value (complex data) from buffer 806 and decodes it into corresponding bits. After n tone values are decoded, QAM 810 concatenates n decoded bits and outputs the same as a second bit-stream (SYMB1). Synchronization logic is provided to keep QAM 808 and QAM 810 operating upon the tones corresponding to the same sub-channel. Outputs of QAMs 808 and 810 are provided to E√-units 718A and 718B, respectively. Accordingly, outputs of E√-units 718A and 718B and switch unit 722 are serial.

Figure 9:
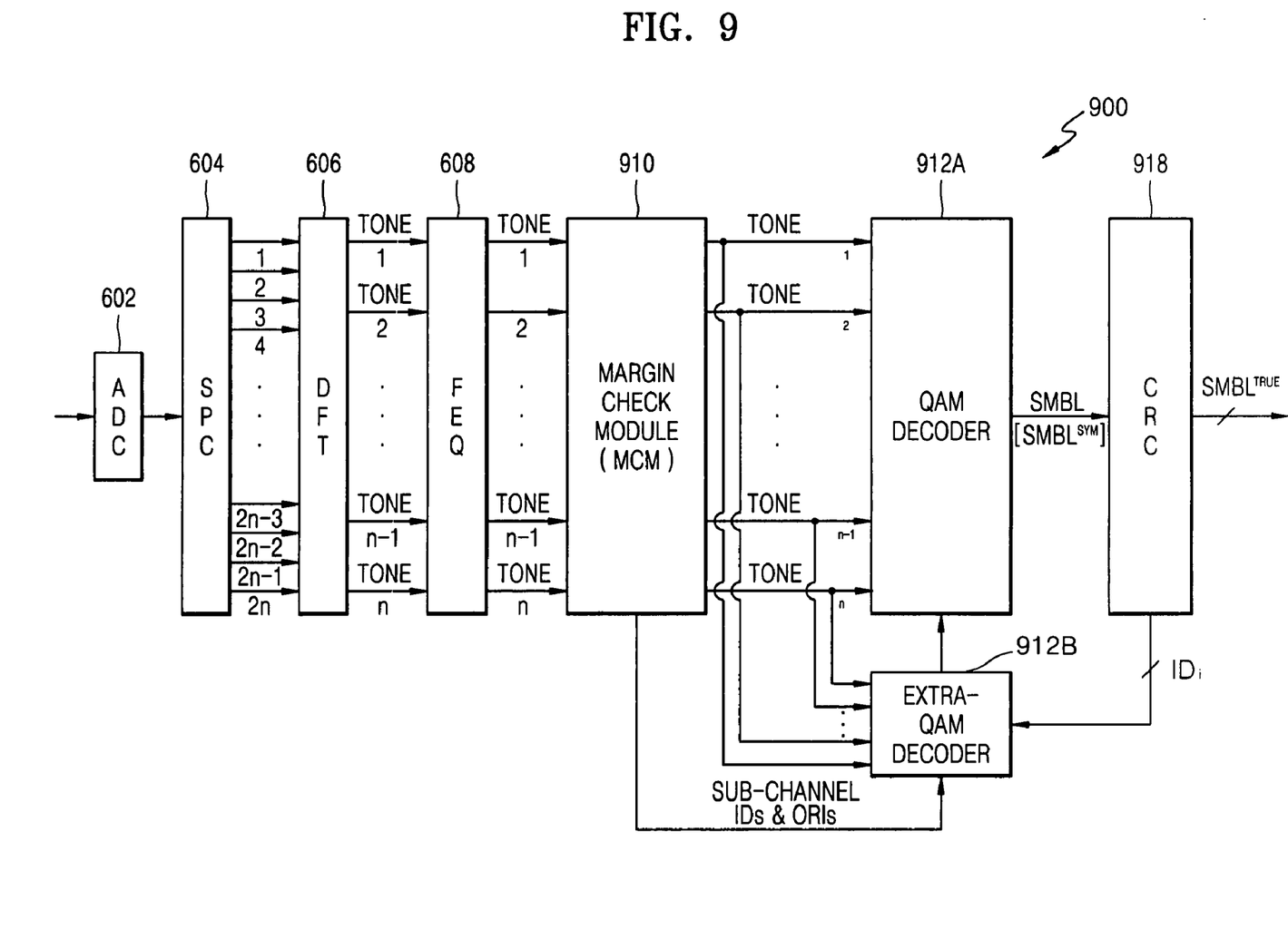
FIG. 9 is a block diagram of a QAM-decoding receiver according to a third embodiment of the present invention.

FIG. 9 is a block diagram of a third QAM-decoding receiver according to a third embodiment of the present invention. Receiver 900 is similar to receiver 700, as reflected in the use of the same item numbers and corresponding item numbers (e.g., 712 and corresponding 912). For brevity, differences between receivers 900 and 700 will be described.

Receiver 900 includes a QAM decoder 912A that generates a bit stream (SYMB) for n tones provided to it. An E√-unit 918 receives the serial bit stream (SMBL) from QAM decoder 912A and iteratively checks whether received bit-stream is correct or not. If symbol SMBL$_i$ is determined to be false by E√-unit 918, then an extra QAM decoder 912B generates the symmetric counterpart symbol SMBL$_i^{SYM}$. It is noted that QAM decoder 912B can be provided with a mixer 1008 such as mixer 802 in order to produce a symmetric counterpart symbol. Counterpart symbol $SMBL_i^{SYM}$ is provided to QAM decoder 912B, and QAM decoder 912A correspondingly replaces $SMBL_i$ with $SMBL_i^{SYM}$. Then $E\sqrt{}$-unit 918 rechecks the symbol $SMBL_i^{SYM}$. If $SMBL_i^{SYM}$ is correct, $E\sqrt{}$-unit 918 asserts 'true' signal and pass the symbol to higher layer, or asserts 'false' signal and recycles the process.

Figure 10:
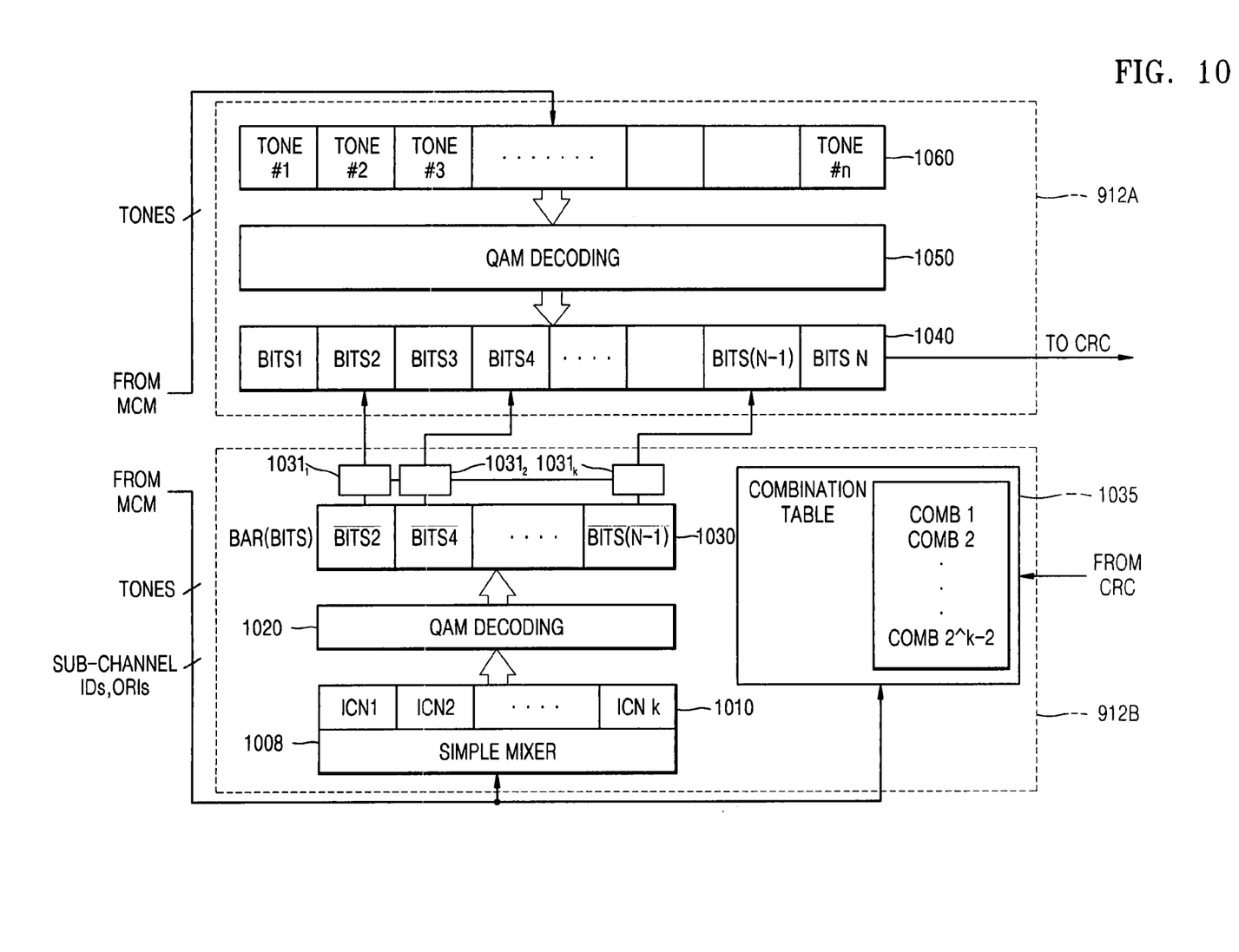
FIG. 10 is a detailed block diagram of a extra QAM decoder and a QAM decoder of the third embodiment of the present invention.

FIG. 10 is a more detailed block diagram of QAM decoder 912A and extra QAM decoder 912B of FIG. 9, according to another embodiment of the present invention. The n number of tones from MCM 910 are inputted to QAM decoder 912A. QAM decoder 912A includes: a buffer 1060 for storing equalized n tone values (which are of complex data type); a QAM decoding block 1050; and a frame buffer 1040 for storing bits value corresponding to each tone value. Extra QAM decoder 912B includes: a mixer 1008, which generates $Tone_i^{SYM}$ according to the extra noisy sub-channel ID and overlap region information; a buffer 1010 for storing sub-channel ID & overlap region information on determined to be extra noisy sub-channels; a QAM decoding block 1020; a frame buffer 1030; a combination table 1035; and a plurality of switches $1031_1, 1031_2, \ldots, 1031_k$. QAM decoding block 1050 inputs n tones and outputs a serial bit stream to frame buffer 1040. $E\sqrt{}$-unit 918 receives and checks the bit stream from frame memory 1040. If the result of the check by $E\sqrt{}$-unit 918 is true, then $E\sqrt{}$-unit 918 outputs the bit stream to output terminal. If the result of the check by $E\sqrt{}$-unit 918 is false, then the result of the check by $E\sqrt{}$-unit 918 outputs a "next" signal to QAM decoder 912B.

Extra QAM decoder (EQD) 912B receives a list of extra-noisy-sub-channel IDs and overlap region information for the respective extra-noisy-sub-channel from MCM 910. QAM decoding block 1020 decodes the $Tone_i^{SYM}$ value to its corresponding bits $\overline{BITSi}$. When EQD 912B receives the "next" signal from $E\sqrt{}$-unit 918, at least one switch among the multiple switches $1031_1, 1031_2, \ldots 1031_k$ are controlled to close according to combination table 1035. First, switch $1031_1$ is closed so that the second QAM decoded bits Bits2 in frame memory 1040 are replaced with a set of symmetric QAM decoded bits, $\overline{BITS2}$. The $E\sqrt{}$-unit 918 receives and checks the bit stream from frame memory 1040. If the result of the check by $E\sqrt{}$-unit 918 is true, then $E\sqrt{}$-unit 918 outputs the bit stream to the output terminal. If the result of the check by $E\sqrt{}$-unit 918 is false, then $E\sqrt{}$-unit 918 outputs a "next" signal to EQD 912B. Second, switch $1031_2$ is closed so that the fourth QAM decoded bits Bits4 in frame memory 1040 are changed to another set of symmetric QAM decoded bits, $\overline{BITS4}$. In a similar way, all combinations of symbols of the extra-noisy-sub-channels are changed according to combination table 1035.

Implicit in the description above of the operation of various example embodiments are descriptions of corresponding methods, and similarly corresponding software to cause a processor to carry out steps of the methods.

Embodiments of the present invention perform better than the Background Art. For example, embodiments of the present invention can enjoy up to about 3 dB relative improvement in signal to noise ratio (SNR) as contrasted with the Background Art.

The present invention being thus described, it will be obvious that the same may be varied in many ways. Such variations are not to be regarded as a departure from the spirit and scope of the present invention, and all such modifications are intended to be included within the scope of the present invention.

I claim:

1. A demodulator for recovering a transmitted symbol represented by a received quadrature amplitude modulation (QAM) signal, the demodulator comprising:
    a QAM-decoding block operable to
        map a received signal vector onto a constellation so as to yield a first symbol, and
        identify a next-most probable second symbol based upon the signal vector; and
    a selection unit operable to select, among the first and second symbols, the one having a lower error content as corresponding to the transmitted symbol; wherein
    the QAM-decoding block includes
        at least two decoders operable to produce at least first and second bit streams corresponding to the first and second symbols, respectively; and
    the selection unit includes
        at least two error-checking units operable upon the first and second bit streams; and
        logic to select the one of the first and second bit streams having the lower error content as corresponding to the transmitted symbol.

2. The demodulator of claim 1, wherein the error-checking units are operable to perform cyclic redundancy code (CRC) error checking.

3. The demodulator of claim 1, wherein each decoder includes:
    a mixer to produce a symmetric version of the signal vector;
    first and second conversion units to convert the signal vector and symmetric version thereof into the first and second bit streams, respectively.

4. The demodulator of claim 1, wherein the QAM signal is also a multiple-carrier modulated signal.

5. A demodulator for recovering a transmitted symbol represented by a received quadrature amplitude modulation (QAM) signal, the demodulator comprising:
    a QAM-decoding block operable to
        map a received signal vector onto a constellation so as to yield a first symbol, and
        identify a next-most probable second symbol based upon the signal vector; and
    a selection unit operable to select, among the first and second symbols, the one having a lower error content as corresponding to the transmitted symbol; wherein the QAM-decoding block is further operable to
    evaluate whether a sub-channel to which the first symbol corresponds is extra-noisy;
    determine, if the sub-channel is extra-noisy, whether the signal vector is mapped to an overlap region;
    proceed, if the signal vector is mapped to an overlap region, to the identification and selection.

6. The demodulator of claim 5, wherein the QAM-decoding block is further operable to:
    skip, if either the sub-channel is not extra-noisy or the signal vector is not mapped to an overlap region, the identification and selection and instead treat the first symbol as corresponding to the transmitted symbol.

7. The demodulator of claim 5, wherein:
    the constellation is organized as a grid of square cells;
    symbols forming the constellation are located at the centers of the cells, respectively;
    each side of the cells is of length, d;
    each cell has overlap regions corresponding to each adjoining cell, respectively;

each overlap region for a given cell is defined as the intersection of the given cell and a circle of radius, r, for the corresponding adjoining cell, where $$\frac{d}{2} < r \le \frac{\sqrt{2}}{2}d$$

and r is centered upon the adjoining cell.

8. The demodulator of claim 5, wherein the QAM signal is also a multiple-carrier modulated signal.

9. A method of recovering a transmitted symbol represented by a received quadrature amplitude modulation (QAM) signal, the method comprising:
   mapping, by a decoder, a received signal vector onto a constellation to yield a first symbol;
   identifying a next-most probable second symbol based upon the signal vector;
   selecting, by a selector, among the first and second symbols, the one having a lower error content as corresponding to the transmitted symbol;
   receiving an indication of whether a sub-channel to which the first symbol corresponds is extra-noisy;
   determining, if the sub-channel is extra-noisy, whether the mapping step has mapped the signal vector to an overlap region; and
   proceeding, if the signal vector is mapped to an overlap region, to the identifying and selecting steps.

10. The method of claim 9, further comprising:
    skipping, if either the sub-channel is not extra-noisy or the signal vector is not mapped to overlap region, the identifying and selecting steps and instead treating the first symbol as corresponding to the transmitted symbol.

11. The method of claim 9, wherein:
    the constellation is organized as a grid of square cells;
    symbols forming the constellation are located at the centers of the cells, respectively;
    each side of the cells is of length, d;
    each cell has overlap regions corresponding to each adjoining cell, respectively; and
    each overlap region for a given cell is defined as the intersection of the given cell and a circle of radius, r, for the corresponding adjoining cell, where $$\frac{d}{2} < r \le \frac{\sqrt{2}}{2}d$$

and r is centered upon the adjoining cell.

12. A demodulator comprising:
    a decoder configured to,
       map a received signal vector onto a constellation to yield a first symbol,
       receive an indication of whether a sub-channel to which the first symbol corresponds is extra-noisy,
       determine, if the sub-channel is extra-noisy, whether the signal vector has been mapped to an overlap region, and
       identify a next-most probable second symbol based upon the signal vector; and
    a selector configured to, select, among the first and second symbols, the one having a lower error content as corresponding to the transmitted symbol.

* * * * *